No. 864,288. PATENTED AUG. 27, 1907.
F. P. BOWMAN.
HARROW.
APPLICATION FILED JULY 3, 1906.

2 SHEETS—SHEET 1.

WITNESSES:
F. C. Gibson.
John T. Schrott.

INVENTOR
F. P. Bowman.

BY
Fred G. Dieterich
ATTORNEYS

No. 864,288. PATENTED AUG. 27, 1907.
F. P. BOWMAN.
HARROW.
APPLICATION FILED JULY 3, 1906.
2 SHEETS—SHEET 2.
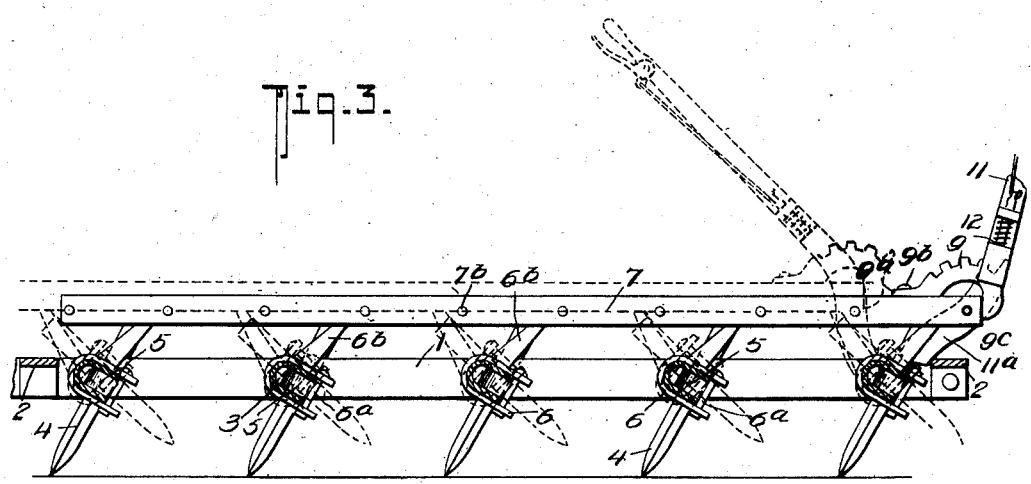
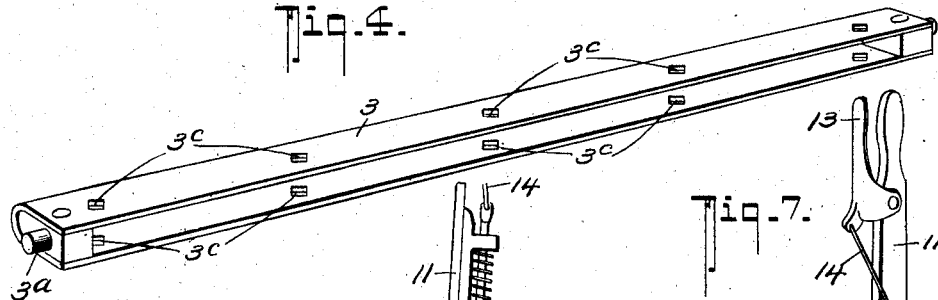
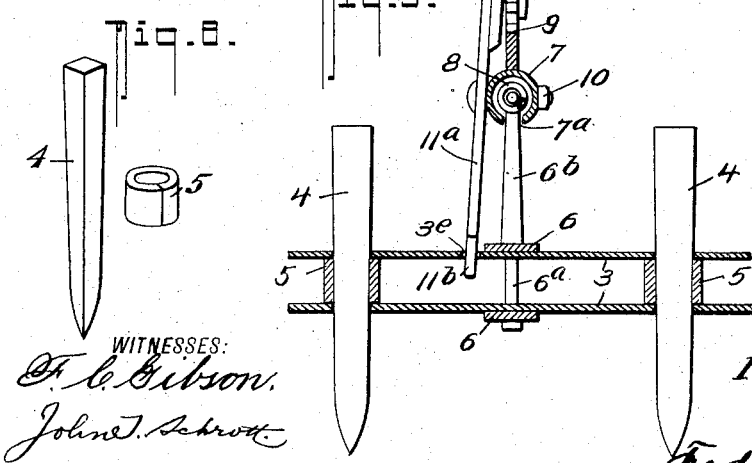
WITNESSES:
F. C. Gibson.
John T. Schrott.
INVENTOR
F. P. Bowman.
BY
Fred G. Dieterich
ATTORNEYS

UNITED STATES PATENT OFFICE.

FRANK P. BOWMAN, OF BRIDGEWATER, VIRGINIA.

HARROW.

No. 864,288.     Specification of Letters Patent.     Patented Aug. 27, 1907.

Application filed July 3, 1906. Serial No. 324,636.

*To all whom it may concern:*

Be it known that I, FRANK P. BOWMAN, residing at Bridgewater, in the county of Rockingham and State of Virginia, have invented certain new and useful Improvements in Harrows, of which the following is a specification.

My invention relates to certain new and useful improvements in harrows and it more particularly seeks to provide a harrow of a very simple and effective construction in which means are provided for relieving the strain on the harrow teeth when they engage obstructions such as rocks, stumps etc., and in which means are also provided whereby the harrow teeth may be adjusted to any desired angle so that the harrow may be used as a harrow proper, a digger, or a crusher, as may be found desirable.

My invention also embodies an improved device for securing the harrow teeth in the tooth bar.

Generally, my invention comprises a harrow frame in which a plurality of tooth bars are pivoted, a rod pivotally connected with each tooth bar, an operating lever connected to the rod, by means of which the tooth bar may be locked to hold the teeth at the desired angle, and means within the rod and coöperating with the tooth bars for relieving such tooth bars to permit them to independently turn on their pivots when the teeth thereof engage an obstruction, so that the teeth will pass over the obstruction without moving the other tooth bars.

With other objects in view than have been heretofore specified, my invention also comprises certain novel construction, and arrangement of parts, all of which will be first described in detail and then specifically pointed out in the appended claims, reference being had to the accompanying drawings, in which:—

Figure 1:
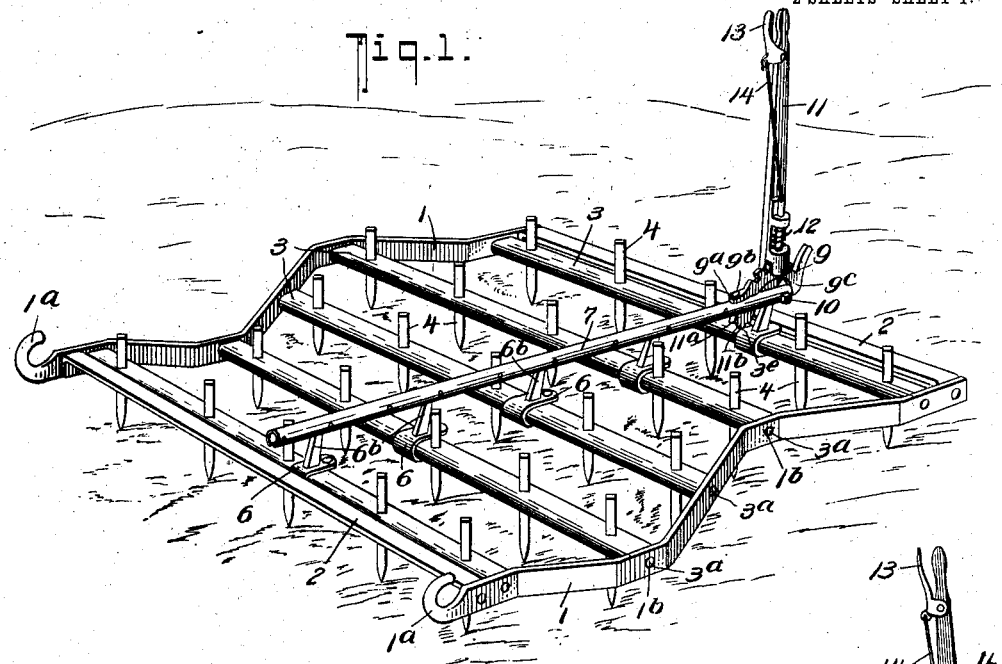
Figure 2:
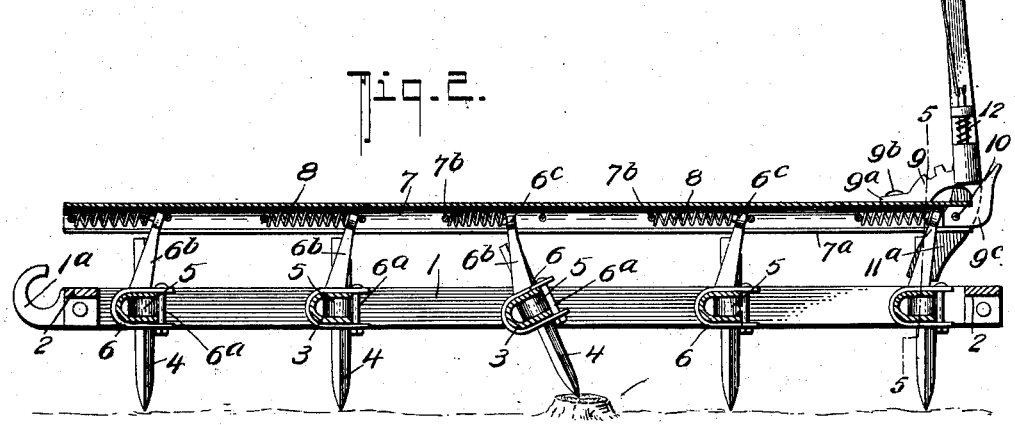
Figure 6:
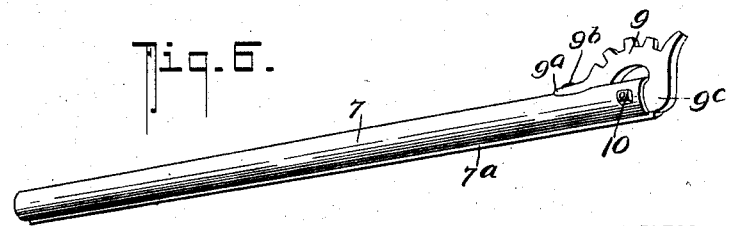

Figure 1, is a perspective view of my harrow. Fig. 2, is a vertical, longitudinal section thereof, showing the teeth in a vertical position, one set clearing an obstruction. Fig. 3, is a similar view, the teeth being shown in a position to convert the harrow into a digger in full lines, and in a position to act as a crusher in dotted lines. Fig. 4, is a detail perspective view of one of the tooth bars. Fig. 5, is a detail cross section on the line 5—5 of Fig. 2. Fig. 6, is a detail perspective view of the tooth bar connecting rod. Fig. 7, is a similar view of the operating lever. Fig. 8, is a detail perspective view of a tooth and its securing collar detached.

Referring now to the accompanying drawings, in which like numerals and letters of reference indicate like parts in all of the figures, 1 designates the side bars of the draft frame, which at each end are braced by transverse bars 2—2. The side bars 1 terminate at the front in draft hooks 1$^a$, as shown.

The bars 1 at suitable intervals have bearing apertures 1$^b$ in which the bearing studs 3$^a$ of the tooth bars 3 are fulcrumed. The tooth bars 3 comprise a member substantially U-shaped in cross section provided at suitable intervals with tooth receiving apertures 3$^c$ in the flats of the bar in which the teeth 4 fit, and to hold the teeth 4 in place, I form them angular in cross section, and the apertures 3$^c$ to correspond. Between the flats of the U-shaped bars 3 are split collars 5, through which the teeth 4 pass, which teeth being formed slightly wedge shaped are hammered down tightly into the collar 5, thus securing them firmly in place.

Each tooth bar 3 has a clamp 6 that is secured thereto by a bolt and nut 6$^a$ or rivets, if desired, which clamps 6 are each provided with upwardly projecting arms 6$^b$ terminating in an upwardly extending finger or lug 6$^c$ to fit within the tubular connecting rod 7. The rod 7 has a slot 7$^a$ extending its full length on the under-face thereof to permit passage of the ends of the arms 6$^b$, as shown. At the rear end, the rod 7 is provided with a segmental rack 9, one end 9$^a$ of which is secured to the bar 7 by rivets 9$^b$ or otherwise, while the other end 9$^c$ passes into the rod 7 and is apertured to permit passage of a bolt 10 that passes through the end of the rod 7 and through an operating lever 11 whose lower end terminates in a curved portion 11$^a$ and a bearing finger 11$^b$ that enters a bearing aperture 3$^e$ in the rear tooth bar 3, such connection with the bar 3 being loose to enable proper manipulation of the lever 11 on its pivot bolt 10. The lever 11 carries a latch 12 that is adapted to enter the rack notches of the segmental rack 9, and is also provided with a hand engaging latch operating lever 13 that connects with the latch 12 by a rod 14, as clearly shown in the drawings. The rod 7 it will be observed, forms a housing for the buffer springs 8 and the ends of the arms that coöperate therewith, and thereby fully protects such parts from the elements as well as from danger of injury. The stops 7$^b$ serve as abutments for the buffer springs 8 as well as stops for the tooth bar operating arms.

When the apparatus is operated as a harrow, and the parts are in the position shown in Figs. 1 and 2, the buffer springs 8 will be at their normal tension, which tension will become increased when the parts are in the position shown in dotted lines in Fig. 3, the crushing position. The tension of the springs 8 may be also increased if desired, by throwing the lever 11 backward to bring the teeth toward the position shown in full lines in Fig. 3.

From the foregoing it will be seen that I have provided a very simple and effective construction of harrow in which the various adjustments of the teeth can be readily made and which embodies all the essential advantages of a rigid or spike tooth harrow as well as those of the so called "spring" tooth type. Also the means for securing the tooth bar enables a tooth to be readily replaced when broken or worn without dismembering the apparatus or without necessitating the removal of the remaining teeth in the bar. Again, by having the tooth bars adjustable, a greater range of work is possible with this harrow than with rigid tooth harrows now in common use.

By mounting the tooth bars as described, only that bar whose tooth is passing over an obstruction is inactive during such period, since as soon as the individual bar passes over the obstruction it springs back to its normal position and is again at work ere the next following bar's teeth meet the obstruction.

From the foregoing description taken in connection with the accompanying drawings it is thought the complete construction, operation and numerous advantages of my invention will be readily understood by those skilled in the art to which it appertains, and I desire to say that slight changes in the detail construction and arrangement of parts may be made without departing from the scope of my invention or that of the appended claims.

What I claim is:—

1. A harrow comprising in combination, a draft frame, a plurality of tooth bars fulcrumed therein, arms carried by said tooth bars, a tubular slotted rod connecting the ends of said arms, buffer springs and stops carried by said rod to coöperate with said arms, and means for adjusting said rod longitudinally to set the teeth at various angles to the work.

2. A harrow comprising a draft frame, a series of tooth bars pivotally mounted therein, clamps having arms, secured to each bar, a slotted tubular rod held over the ends of said arms, said arms having fingers within said rod, said rod having stops, coil springs within said rod between said fingers and stops, and means for adjusting said rod and holding it in its adjusted positions, substantially as shown and described.

3. A harrow comprising a draft frame, a series of tooth bars pivotally mounted thereon, clamps having arms secured to each bar, a slotted tubular rod held over the ends of said arms, said arms having fingers within said rod, said rod having stops, coil springs within said rod between said fingers and stops, a segmental rack secured to said rod at one end, a lever pivoted to said rod and having a finger to enter an aperture in one of the bars, a latch and latch operating means carried by the lever, for coöperating with said segmental rack.

4. In a harrow, pivoted tooth bars, means for adjusting said bars to various positions, buffer devices for each bar, and means forming a housing for said buffer devices, substantially as shown and described.

5. In a harrow, a draft frame, a plurality of tooth bars fulcrumed therein, a rod pivotally connected with each tooth bar, an operating lever connected to the rod, means within the rod and coöperating with the tooth bars for relieving said tooth bars to permit them to independently turn on their pivots when the teeth thereof engage an obstruction.

6. A harrow comprising in combination, a draft frame, a plurality of tooth bars fulcrumed therein, arms carried by the tooth bars, a hollow rod connecting the ends of said arms, buffer springs mounted within said hollow rod and operatively engaging the tooth bar arms, stops carried by the rod to coöperate with the arms, and means for adjusting said rod to set the teeth at various angles to the work.

FRANK P. BOWMAN.

Witnesses:
A. E. DIETERICH,
JOHN T. SCHROTT.